United States Patent [19]
Kitamura

[11] 4,424,442
[45] Jan. 3, 1984

[54] SCANNING METHOD USING A PLURALITY OF BEAMS AND APPARATUS THEREFOR

[75] Inventor: Takashi Kitamura, Yokohama, Japan

[73] Assignee: Canon Kabushiki Kaisha, Tokyo, Japan

[21] Appl. No.: 327,447

[22] Filed: Dec. 4, 1981

[30] Foreign Application Priority Data

Dec. 18, 1980 [JP] Japan .................. 55-180194

[51] Int. Cl.³ ............................................. H01J 3/14
[52] U.S. Cl. ..................................... 250/236; 350/6.8
[58] Field of Search ....................... 250/236, 235, 234; 350/6.8; 358/206, 208, 293

[56] References Cited
PUBLICATIONS

Hayes, "IBM Technical Disclosure Bulletin", Feb. 1974, pp. 2826-2828.

*Primary Examiner*—David C. Nelms
*Assistant Examiner*—Darwin R. Hostetter
*Attorney, Agent, or Firm*—Fitzpatrick, Cella, Harper & Scinto

[57] ABSTRACT

A scanning method for scanning a scanned surface simultaneously by a plurality of beam spots in which each beam spot passing through light beam detecting means provided outside the requisite scanned area of the scanned surface, to detect the time when each beam spot begins the scanning of the requisite scanned area, is focused with respect to the scanning direction of the beam spot and defocused with respect to a direction orthogonal to the scanning direction.

7 Claims, 6 Drawing Figures

SCANNING METHOD USING A PLURALITY OF BEAMS AND APPARATUS THEREFOR

BACKGROUND OF THE INVENTION

1. Field of the Invention

This invention relates to a scanning method for scanning a surface simultaneously with a plurality of beam spots and an apparatus for practicing this method.

2. Description of the Prior Art

Heretofore, in an apparatus for deflecting a light beam spot and scanning a surface, for the purpose of knowing the time when the beam spot begins the scanning of an area on a surface (this area will hereinafter be referred to as the requisite scanned area), a photodetector element for detecting the beam spot has been disposed adjacent to the requisite scanned area. A primary scanning synchronous signal is obtained from the signal produced by this photodetector element and when the beam spot scans the requisite scanned area, synchronization of modulation signals for recording to be imparted to the beam spot or synchronization of photoelectric elements which detect light scattered by reflection of the beam spot are determined by the primary scanning synchronous signal.

As the photodetector element for detecting the beam position, an element high in response speed must be chosen because the time during which the light beam passes through the photodetector element is short.

Heretofore, where scanning has been effected by a single light beam, the response speed has been made higher by reducing the light-receiving surface area of the photodetector element. However, in a system wherein a plurality of scannings are effected simultaneously by a plurality of light beams, it is not advantageous to decrease the response speed increasing the light-receiving surface area of the photodetector element so as to be capable of receiving all of the plurality of light beams. Also, providing a photodetector element for each of the light beams is physically difficult and economically not advantageous because of the size of photodetector elements and the spacing between light beams.

SUMMARY OF THE INVENTION

It is an object of the present invention to provide, even in a system of scanning with a plurality of light beams, a scanning method utilizing a photodetector element high in response speed and an apparatus for practicing this method.

In the scanning method wherein a surface is simultaneously by a plurality of beam spots of which the adjacent ones on the scanned surface are positionally displaced in two directions, i.e. primary scanning direction and the secondary scanning direction, the above object of the present invention is achieved by substantially equalizing the position each of the light beams occupies in the secondary scanning direction orthogonal to the primary scanning direction when the light beams pass through the photodetector element. It is desirable that the light beams keep a predetermined spacing therebetween with respect to the primary scanning direction. In the scanning apparatus according to the present invention, the shape of the beams as they pass through the photodetector element is such that they are focused with respect to the component in the scanning direction and defocused with respect to the component in a direction orthogonal to the scanning direction.

In the scanning apparatus of the present invention, a photodetector element is provided on the same plane as the surface scanned by the light beams. Light beams deflected by deflecting means and a scanning imaging optical member are detected by the photodetector element. However, cylindrical optical system is provided in front of the photodetector element, and after having passed through this cylindrical optical system, the light beams are detected by the photodetector element. The cylindrical optical system is provided so that the direction of the cylindrical axes thereof are coincident with the scanning direction (the primary scanning direction) of the light beams. Accordingly, the shape of the beam spots passing through the photodetector element is such that they are in-focus with respect to the primary scanning direction and out-of-focus with respect to the secondary scanning direction orthogonal to the primary scanning direction.

Although not described in the following embodiments, where the light beams enter the photodetector element from the deflector without passing through the scanning imaging optical member, an anamorphic optical element such as a toric lens having different powers in different orthogonal directions may be disposed in front of the photodetector element, whereby the light beams on the photodetector element can be focused in the primary scanning direction and defocused in the secondary scanning direction.

The invention will become more fully apparent from the following detailed description thereof taken in conjunction with the accompanying drawings.

DESCRIPTION OF THE PREFERRED EMBODIMENTS

Figure 1:
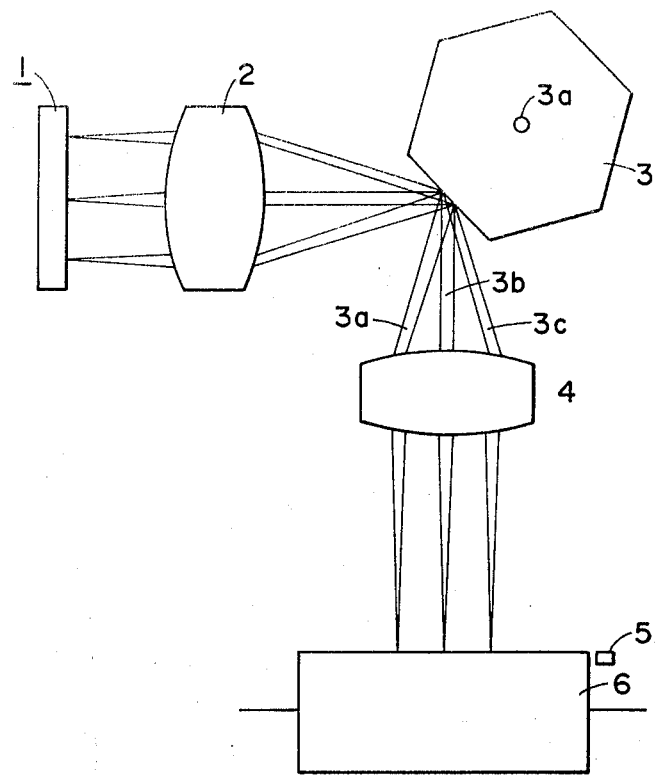
FIGS. 1 and 2 are schematic views showing an embodiment of a laser beam scanning apparatus to which a scanning system using a plurality of light beams is applied.
Figure 2:
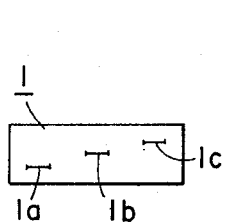

Referring to FIG. 1, a schematic perspective view is shown of a laser beam printer having a scanning apparatus including photodetector means for generating out a synchronizing signal. In FIG. 1, reference numeral 1 designates a semiconductor laser or light source portion for generating a plurality of light beams simultaneously, reference numeral 2 denotes a collimater lens having one of its focal planes on the light diverging surface of a light source portion, reference numeral 3 designates a polygonal mirror for simultaneously deflecting the light beams from the light source portion, reference numerals 3a, 3b, and 3c denote deflected beams scanned by the deflector, reference numeral 4 designates a scanning imaging lens which is an f-θ lens, reference numeral 5 designates a photodetector element, and reference numeral 6 denotes a photosensitive drum. FIG. 2 is a front view of the light source portion 1, and light-emitting portions 1a, 1b and 1c are displaced in the direction parallel to the rotary shaft 3a of the polygon mirror.

Figure 3:
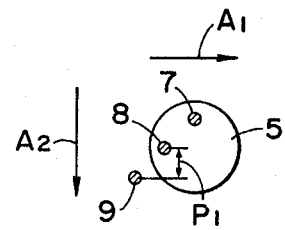
FIG. 3 illustrates a case where a photodetector element is used in the method according to the prior art.

FIG. 3 illustrates a case where detection of a plurality of beams is carried out by the photodetecting method according to the prior art. There a photodetector element 5 as seen from the front thereof and the manner in which a plurality of beam spots pass through the element 5 can be seen. The beam spots 7, 8 and 9 slightly shift in the primary scanning direction $A_1$, and each beam spot is spaced apart by the scanning pitch $P_1$ of the primary scanning line with respect to the secondary scanning direction $A_2$. Accordingly, by the beam scanning, the beam spots 7, 8 and 9 successively pass through the photodetector element 5, but in order that any of the beam spots may pass through the light-receiving surface of the photodetector element, use must be made of a photodetector element having a sufficiently large light-receiving surface. That is, the photodetecting surface of the photodetector element must have a sufficient size with respect to the secondary scanning direction.

Figure 4A:
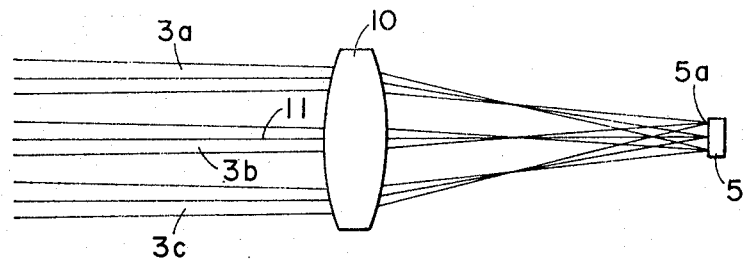
FIGS. 4A, 4B and 5 show embodiments of the present invention.
Figure 4B:
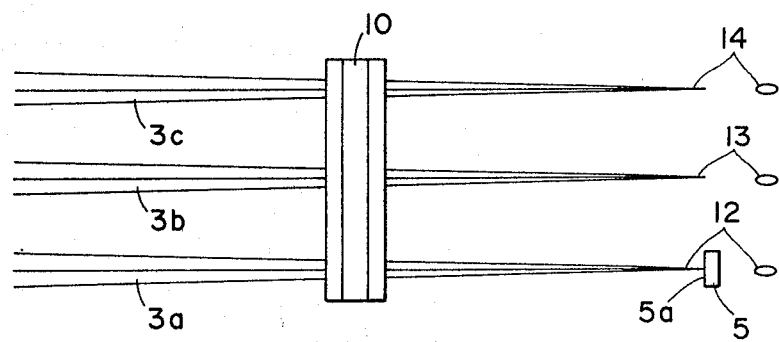

FIG. 4 shows an embodiment of the photodetecting portion of the scanning apparatus according to the present invention, FIG. 4A being a view of the photodetecting portion as seen from the primary scanning direction and FIG. 4B being a view of the primary scanning surface as seen in the fashion of a plan view. Reference numeral 10 designates a cylindrical lens provided forwardly of the photodetector element 5, and the cylindrical axes of this lens are substantially coincident with the primary scanning direction of the beam spots. If the light-receiving surface 5a of the photodetector element 5 is disposed on the focal plane of the cylindrical lens 10, where the principal rays of incident lights 3a, 3b, 3c on the cylindrical lens 10, for example, are substantially parallel to the optical axis 11 of the cylindrical lens 10, the positions which the beam spots 12, 13 and 14 occupy on the light-receiving surface 5a of the photodetector element with respect to the secondary scanning direction will be about the same. That is, with respect to the primary scanning direction, the beam spots 12, 13 and 14 are focused and a predetermined spacing is maintained, whereas with respect to the secondary scanning direction, the beam spots are defocused and occupy the same position with respect to the secondary scanning direction. Accordingly, with the deflecting action of the deflector, the beam spots 12, 13 and 14 successively pass through the same position of the photodetector element. Therefore, in the present invention, the photodetecting surface of the photodetector element 5 in the secondary scanning direction may have the same area as in the conventional case where a single light beam is detected and accordingly, the photoresponse speed is high. Also, to generate a synchronous signal in the primary scanning direction, the positions of the beam spots may be arbitrary in the secondary scanning direction.

Figure 5:
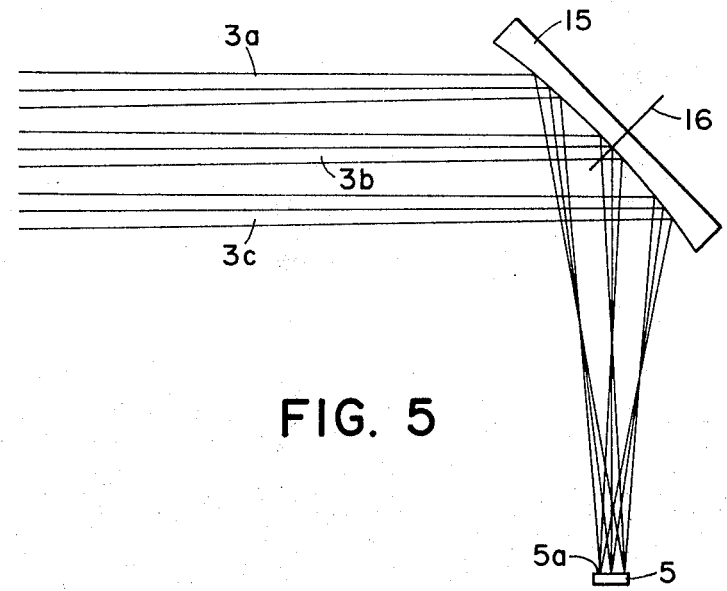

FIG. 5 shows another embodiment of the photodetecting portion in the apparatus of the present invention as seen from the primary scanning direction. Reference numeral 15 designates a cylindrical mirror provided forwardly of the photodetector element 5 and having its cylindrical axis disposed parallel to the primary scanning direction of the light beam. Where the principal rays of incident lights 3a, 3b, 3c on the cylindrical mirror 15 are at a predetermined angle with respect to the optical axis 16 of the cylindrical mirror 15, the centers of the beam spots on the light-receiving surface of the photodetector element 5 disposed on the focal plane of the cylindrical mirror 15 occupy substantially the same position with respect to the secondary scanning direction and successively pass through the light-receiving surface of the small photodetector element 5.

In the above-described embodiments, no mention has been specifically made of an electric circuit for effecting control such as modulation of the light beam by the output of the photodetector element because any of several well-known control circuits may be used as such control means.

Also, in the above-described embodiments, a semiconductor laser array have been shown as the means for providing a plurality of beams simultaneously, but in the present invention, a plurality of independently modulable light beams can also be provided by other well-known means such as a diode array, an acousto-optical element, an electro-optical element or the like.

Thus, according to the present invention, even if two or more light beams are scanned simultaneously, a small photodetector can be utilized and this produces the benefits that the response of the photodetector element is radipd, that high speed operation of the laser beam printer or the like becomes possible and that the crosstalk by adjacent beams can be reduced.

What I claim is:

1. A scanning method using a pluraltiy of beams, comprising the steps of:
   generating a plurality of light beams simultaneously;
   deflecting said plurality of light beams in a primary scanning direction;
   causing said light beams to lie at substantially the same coordinate position relative to a coordinate axis defined by a direction orthogonal to the primary scanning direction and causing each of the beams having such positional relation to pass over light beam detecting means; and
   scanning a plurality of different positions relative to a coordinate axis defined by the primary scanning direction on a scanned surface with said plurality of light beams.

2. A scanning method using a plurality of beams, comprising the steps of:
   providing a plurality of separated light beams simultaneously;
   deflecting said plurality of light beams simultaneously in a primary scanning direction;
   detecting each of said light beams with photodetector means by rendering the light beams into out-of-focus condition about a coordinate axis defined by a direction orthogonal to the primary scanning direction so that the light beams occupy substantially the same coordinate position with respect to the axis defined by the direction orthogonal to the primary scanning direction; and
   scanning a requisite area on a scanned surface with the plurality of light beams focused in the primary scanning direction.

3. An apparatus for scanning in a primary scanning direction a scanned surface simultaneously with a plurality of beam spots, comprising:
   first optical means for forming a plurality of scanning beam spots and displacing said scanning beam spots in the primary scanning direction in a requisite scanned area to be scanned on the scanned surface; and
   second optical means for forming beam spots so that in at least one area other than said requisite scanned area, said plurality of beam spots occupy the same coordinate position with respect to a coordinate axis defined by the direction perpendicular to the primary scanning direction.

4. An apparatus for scanning a scanned surface simultaneously by a plurality of beam spots, comprising:
 means for supplying a plurality of independent light beams;
 means for simultaneously deflecting the plurality of beams from said light beam supply means in a direction of travel;
 light beam detecting means disposed outside a requisite scanned area of said scanned surface; and
 optical means for causing each beam spot to pass over said light beam detecting means at the same coordinate position of said light beam detecting means with respect to a coordinate axis defined by a direction orthogonal to the direction of travel of the beam spot.

5. An apparatus according to claim 4, further comprising a scanning beam imaging system disposed between said deflecting means and said scanned surface and through which said beams pass before passing over said light beam detecting means.

6. An apparatus according to claim 4, wherein said deflecting means deflects the beams to said optical means before they pass over said detecting means.

7. An apparatus for scanning a scanned surface simultaneously by a plurality of beam spots, comprising:
 a semiconductor laser array emitting a plurality of independently modulable light beams;
 a lens system for collimating the light beams from said semiconductor laser array;
 a deflector for deflecting the light beams from said lens system in a predetermined direction and in a primary scanning direction;
 an imaging optical system for imaging on the scanned surface the light beams deflected by said deflector;
 a beam detector provided adjacent an area of said scanned surface which is subjected to scanning; and
 a cylindrical optical system, provided forwardly of said beam detector with the direction of its axis coincident with the primary scanning direction of the beams, the light beams entering said cylindrical optical system after passing through said imaging optical system, said cylindrical optical system forming the component in the primary scanning direction of the beam spots passing over said beam detector in focused condition and forming the component in a direction orthogonal to the primary scanning direction of the beam spots passing over the beam detector in defocused condition.

* * * * *